Nov. 29, 1960  T. A. JAGEN  2,961,744
METHOD OF MAKING BEARING RINGS
Filed June 30, 1954  2 Sheets-Sheet 1

INVENTOR
THEODORE A. JAGEN,
BY Edward H. Goodrich.
HIS ATTORNEY.

Nov. 29, 1960 T. A. JAGEN 2,961,744
METHOD OF MAKING BEARING RINGS
Filed June 30, 1954 2 Sheets-Sheet 2

INVENTOR
THEODORE A. JAGEN,
BY Edward H. Goodrich.
HIS ATTORNEY.

United States Patent Office 2,961,744
Patented Nov. 29, 1960

2,961,744

METHOD OF MAKING BEARING RINGS

Theodore A. Jagen, Roseland, N.J., assignor to General Motors Corporation, Detroit, Mich., a corporation of Delaware Filed June 30, 1954, Ser. No. 440,444

6 Claims. (Cl. 29—148.4)

This invention relates to a method of making bearing rings and more particularly to an improved method for cold upset forming the outer race rings of a roller bearing to a predetermined shape.

Heretofore, outer race rings of roller bearings have been roughly formed to desired shape by forcing a tapering punch downwardly under very heavy pressure into wedging or expanding relation in an annular metal blank peripherally mounted in a die. As this punch initially feeds into the blank, the upper end of the blank is very tightly wedged between the tapering nose of the punch and the die thereby developing an extremely high radial pressure of the punch against the upper end of the annular blank. As this punch is further forced into the blank, it wipes metal from the top of the blank and drags this metal endwise of the blank along with the punch towards the lower part of the blank. This movement of the punch against the work often results in the tearing of metal in the blank as well as non-uniform cold flow of this metal, thus producing a rough and undesirable finish on the race ring as well as frequently spoiling the ring and damaging the punch and die.

It is, therefore, an object of the present invention to provide an improved cold forming method for shaping bearing rings to a predetermined contour within precisely controlled limits of accuracy.

It is a further object of this invention to provide an improved method for forming bearing race rings by cold upsetting and which avoids an initial wedging of one end of a work blank under heavy radial pressure between a punch and a die.

A further object resides in the provision of an improved cold upsetting method for forming roller bearing outer race rings between a punch and die and wherein the rings are deformed to a predetermined contour principally under the influence of axial pressure.

To these ends and also to improve generally upon methods of this character, the invention consists in the various matters hereinafter described and claimed. In its broader aspects, the invention is not necessarily limited to the specific arrangements selected for illustrative purposes in the accompanying drawings wherein Figures 1 and 2 are diagrammatic illustrations showing the old method of coining a bearing race ring under a heavy radial pressure;

Figures 3 and 4 diagrammatically show my improved method of cold upsetting a bearing race ring to a predetermined size and shape.

Figure 1:
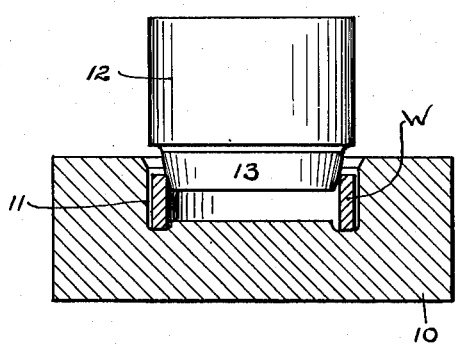
Figure 2:
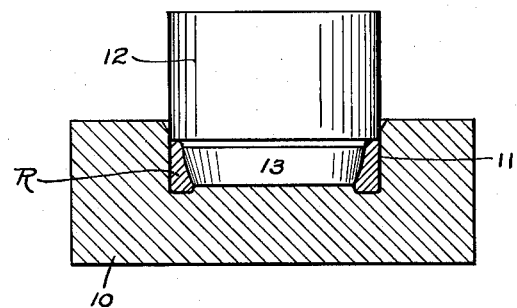
Figure 3:
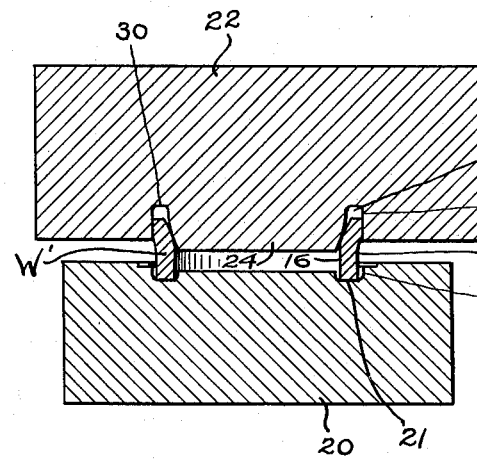
Figure 4:
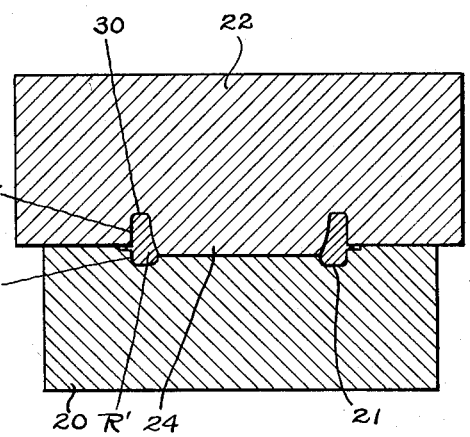

My cold upsetting method for precisely forming race rings as diagrammatically illustrated in Figures 3 and 4, is an important improvement over the old method which is diagrammatically shown in Figures 1 and 2. In this old method, a tubular work blank W having a cylindrical periphery and a concentric cylindrical bore, is loosely received completely within a die 10 having a cylindrical wall 11 of slightly larger diameter than that of the work blank. A punch 12 has its generally conical nose 13 forced downwardly into the work blank to shape the work to the form of the race ring R shown in Figure 2. In this old method, the punch nose 13 is first forced within the top end of the work blank W and wedges this upper end of the work blank under very heavy radial pressure between the nose 13 and the die wall 11. This necessitates very strong and large dies as well as a heavy duty punch press wherein there is much power loss. Also, this wedging action of the nose 13 against the work blank causes rapid punch nose wear necessitating frequent punch replacement. Furthermore, the punch wipes metal from the top of the work blank downwardly, often producing unsatisfactory work shapes and frequently resulting in an objectionable rough interior surface on the work blank. Additionally, race rings made in this manner cannot be formed to close tolerances and usually have to be subjected thereafter to time-consuming, lathe turning operations and subsequent grinding operations.

In my improved method for forming a race ring by cold upsetting as diagrammatically illustrated in Figures 3 and 4 an initial cylindrical blank W' having concentric inner and outer walls 16 and 18 is mounted on a support or punch 20 within a shallow annular recess 21. A cooperating upper punch and die 22 above the punch 20 provides between a tapering punch nose 24 and a surrounding cylindrical die wall 25 an annular recess 27 for receiving the work blank W' during its forming operation. A cylindrical wall 28 of the recess 21 and the corresponding cylindrical die wall 25 are preferably slightly greater in diameter than that of the blank W'. The radial width at the bottom of the recess 27 adjacent a flat annular recess wall 30, is equal to or preferably only slightly less than the radial thickness of the top of the blank W'. The punch nose 24 preferably projects below the bottom of the die to pilot within the work blank W' and the depth of the recess 27 preferably extends through the major portion of the length of the race ring R' which is pressed from the work blank W' as shown in Figure 4. With this arrangement, the initial downward movement of the punch nose 24 and die 22 causes a slight flaring of the work blank W' as shown in Figure 3 to expand this work blank into externally cylindrical engagement with the wall 25 and later into engagement with the cylindrical wall 28. In view of the fact that the narrowest width of the recess 27 adjacent to the wall 30 closely corresponds to the radial thickness of the work blank W', there will be no objectionable heavy radial pressures to initially squeeze the work blank into wedging relation between the punch nose 24 and the die wall 25 as is the case in the old method of grinding race rings. The downward movement of the die 22 and punch nose 24 is not strongly resisted until the upper end of the work blank is engaged by the wall 30 after which a slightly further axially downward movement of the punch nose 24 and the die 22 axially compresses the work blank W' causing it to radially expand into conforming relation with the punches and die as shown in Figure 4. With this improved method, more uniform work is produced with much closer tolerances and much better finish. Additionally, there is very much less wear on the punch nose in engagement with the work blank and it has been found from many tests that the resultant race rings R' can be repeatedly finished to such precision that the race rings thereafter only require a final light finish grinding operation.

Figure 5:
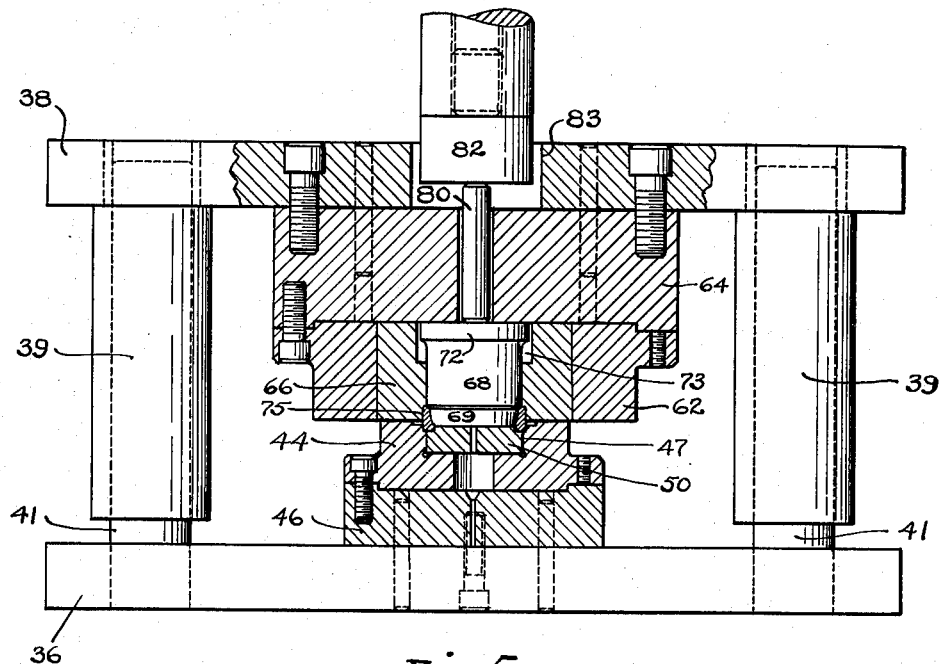
Figure 5 is a view partly in section and showing a punch press containing a race ring formed by my improved method.
Figure 6:
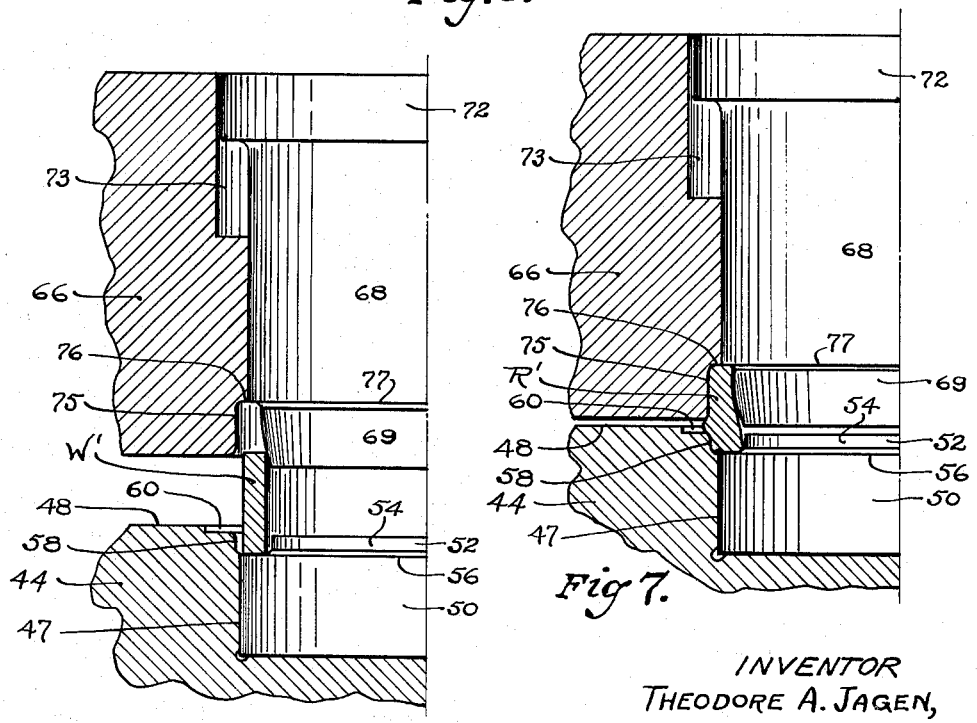
Figure 6 is an enlarged fragmentary sectional view showing a work blank in position at the start of a race ring forming operation.
Figure 7:
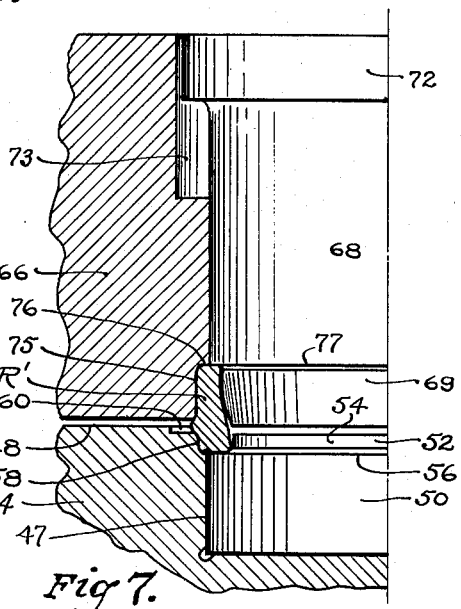
Figure 7 is a fragmentary section illustrating an intermediate stage of forming of a work blank by my cold upsetting method.

Referring now to Figures 5, 6 and 7, a punch press having a base 36 is provided with a top plate 38 to the underside of which are secured spaced downwardly extending sleeve members 39 that slidably fit over upstanding posts 41 mounted in the base. Suitable mechanism (not shown) is provided to move the top plate 38 towards and away from the base 36. A die block 44 is demountably secured as by screws to a supporting block 46 fastened to the base 36. A counterbore 47 extending downwardly from the flat upper face 48 of the die block, demountably receives a lower punch or work support 50 having a short upstanding central portion 52 provided with a flat upper face and a cylindrical periphery 54. A flat annular face 56 on the punch serves as a work support, and a fillet of short radius blends with the surface 54 and with the face 56. The die block 44 is provided with a shallow counterbore 58 having a diameter corresponding to that of the finished race ring. A slight counterbore 60 may be provided within the top of the die block 44 to receive the small amount of flash from the work blank if any during the forming operation thereon. The bottom of the counterbore 58 terminates in a short radius to avoid a sharp corner on the race ring R'. The punch 50, die block 44, and members 46 and 36 therebeneath are provided with communicating bores to release any gases that may be locked in the chamber above the punch 50 during the race ring forming operation.

A die block 62 is demountably secured to the underside of a mounting plate 64 that is demountably fastened to the underside of the top plate 38 as through suitable screws and dowels. A die 66, pressed within a bore in the die block 62, is demountably secured within this die block and has a flat bottom face common with that of the bottom face of the die block 62, this die 66 also locating against a bottom flat face of the plate 64. A punch 68 is slidably journalled in an axial bore through the die 66 and coaxial of the punch 50 therebeneath, the punch 68 having a tapering nose 69 extending slightly below the bottom face of the die 66. The contour of this nose 69 is illustrated as partispherical to form the raceway of a self-aligning bearing. However, the contour of this nose 69 may be conical or of other shape as required. A flange 72 on the upper end of the punch 68 is slidably received in a counterbore 73 at the top of the die 66. A lower end of the die 66 has a counterbore 75 of the same diameter as and concentric with the counterbore 58 and terminates in an annular flat shoulder 76 which is common with a flat annular shoulder 77 on the punch 68 when this punch rests against the underside of the mounting plate 64 as best shown in Figure 6. The coaxial counterbores 58 and 75, which are of the same diameter, form a substantially continuing cylindrical surface to control the outer diameter of the race ring R'. However, the scope of this invention also includes such counterbores being conical, longitudinally arcuate, or of other shapes dependent upon the contour required for the outer periphery of the race ring R'. A slight radius is preferably provided between the shoulder 77 and the punch nose 69 and between the shoulder 76 and the wall of the counterbore 75 to avoid sharp corners on the race ring. As best illustrated in Figure 6, the radial width of the annular recess between the wall of the counterbore 75 and the diverging nose 69 adjacent the common shoulder 76, 77, is equal to or just slightly less than the radial thickness of the top of the tubular work blank W' so that the shoulders 76, 77 may be easily brought down into engagement with the top of the blank W' before the top ring thickness is appreciably changed. If desired, the top of the bore of the work blank W' may be slightly chamfered to aid the entrance of the punch nose 69. With this construction, there is no objectionable very heavy radial wedging pressure of the top of the blank between the punch nose and the die before the blank is engaged by the shoulders 76, 77 and the top of the blank will be correctly formed. Furthermore, there will be a substantially uniform deformation throughout the blank W' to produce the desired final race ring shape. A transfer pin 80 slidably extending through a bore in the mounting plate 64 rests on the top of the punch 68 and at its upper end engages a plunger 82 extending into a bore 83 through the top plate 38, this plunger being raised and lowered by a suitable mechanism such as a cylinder and piston.

In operation, the top plate 38 and associated mechanism is lifted so that a work blank W' may be placed in the shallow annular recess between walls 54 and 58 and upon the annular supporting shoulder 56 of the punch 50. Suitable power mechanism (not shown) urges the top plate 38 and associated punch and die mechanism downwardly until the advancing nose 69 of the punch 68 rests within the top of the work blank W' and centers this work blank with respect to the punch 50 and with respect to the dies 44 and 66. Further downward movement of the top plate 38 locates the punch 68 against the mounting plate 64 after which the punch 68 and die 66 travel downwardly in unison slightly expanding the upper end of the work blank W' and guiding it between the punch nose 69 and the die wall 75 after which the upper end of the work blank W' engages the common wall 76, 77. The upper end of the work blank will be slightly expanded in diameter at this time but will not produce objectionable radial distorting pressures between the punch nose 69 and the die wall 75 since the minimum spacing between this punch nose and the wall 75 is not much less than the thickness of the work blank wall. Consequently, the work blank W' will be formed to the contour generally shown in Figure 7 before any heavy force is required by the press. At this time, it will be noted that the work blank is substantially completely surrounded by the punches and dies so that the further final downward movement of the punch 68 will shape the work blank to the final required race ring shape as shown in Figure 5 with a minimum amount of flash extruding into the recess 60. With this arrangement, there is very little wear on the tapering nose 69 and the punch 68, and tolerances are held to extremely close limits. Consequently, a very smooth finish is provided both on the exterior and interior of the finally formed race ring R'. After the race ring has been cold upset to the required form, the top plate 38 is lifted and suitable pressure as through a hydraulic piston and cylinder mechanism, is exerted upon the plunger 82 and acts through the pin 80 to produce a corresponding movement of the punch 68, this downward movement of the punch being limited by the flange 72 bottoming within the counterbore 73. At this time, the shoulder 77 on the plunger 68 will press the finished race ring R out of the die 66.

I claim:

1. The method of forming an annular bearing member to a predetermined shape comprising the steps of positioning one end of a tubular blank within an annular recess in a fixed support, feeding the nose of a punch into piloting relation within the other end of the blank, feeding a die relative to said punch into spaced relation about the blank, feeding an annular shoulder associated with the die and with the punch into engagement with said other end of the blank before the blank is deformed into interfitting relation with the punch and die, and thereafter continuing the feeding of the die and punch and said shoulder in unison towards the fixed support to axially shorten the blank and deform it into conforming relation with the punch and the die.

2. The method of forming an annular bearing member to a predetermined shape comprising the steps of locating one end of a tubular blank within an annular recess in a fixed support, feeding the tapering nose of a punch towards the support and into piloting engagement with the other end of said blank, feeding a die relative to said punch in radially spaced relation about said other end of the blank and towards said support, engaging said other end of the blank by an annular shoulder common to the die and to the punch before the blank is deformed into conforming relation with the die and punch, and continuing a simultaneous feeding of the die and the punch and said shoulder axially of the blank towards the fixed support until the blank is axially shortened and radially cold upset into conforming relation with the punch nose and with said surrounding portion of the die.

3. The method of cold forming a bearing race ring comprising the steps of locating one end of a tubular metal blank within an annular recess in a fixed support, feeding the tapering nose of a punch toward the support and into piloting relation within the other end of said blank, subsequently feeding a die in radially spaced relation over said other end of the blank, providing cooperative annular shoulders on the punch and on the die which are simultaneously brought into engagement with said other end of the blank prior to radial deformation of the blank into conforming relation with the punch and die, continuing the feeding of the punch and die and said shoulders in unison to shorten the blank and cold upset it into radially conforming relation with said punch and said die, and ejecting the formed race ring from the punch and die.

4. The method of forming an annular member into a predetermined shape comprising the steps of locating one end of a tubular blank within an annular recess in a fixed support, feeding the tapered nose of a punch towards the support and into the other end of said blank, subsequently feeding a die into radially spaced surrounding relation with said other end of the blank, providing cooperating shoulders on the die and on the punch which are brought into end engagement with the end of the blank before it is radially deformed into interfitting relation with the punch and with the die, continuing the feeding of the punch and die in unison towards the fixed support to shorten the blank and deform it into conforming relation with the punch and die, withdrawing the punch and die from said support and axially feeding the punch relative to said die to eject the formed annular member from the punch and die.

5. The method of forming a bearing race ring comprising the steps of locating one end of a tubular blank against a fixed support in the bottom of an annular recess having annular walls provided by a cooperating punch and die, axially feeding the nose of a second punch into the other end of said blank, feeding a second die relative to the second punch into spaced surrounding relation about the other end of said blank, simultaneously feeding cooperating shouldered portions on the second punch and on said second die into end engagement with the blank before the blank is radially deformed into conformity with any of the adjacent punch and die walls, and continuing the simultaneous feeding of the second punch and die towards said recess until the blank is cold upset into conforming relation with all of the adjacent punch and die walls.

6. The method of forming a bearing member comprising the steps of locating one end of a tubular blank in an annular recess in a support, providing a relative feeding movement between a punch and the support to locate the nose of the punch within the other end of said blank, simultaneously feeding the punch and a die surrounding the punch towards said support over an end of the blank and locating an annular shoulder associated with said punch and die against said other end of the blank before deformation of said blank, and continuing the simultaneous feeding of the punch and die towards the support to simultaneously axially compress and radially deform the blank to the required shape.

References Cited in the file of this patent

UNITED STATES PATENTS

| 1,967,821 | Hess | July 24, 1934 |
| 2,267,229 | Zimmerman | Dec. 23, 1941 |